(12) United States Patent
Geukens et al.

(10) Patent No.: US 12,260,101 B2
(45) Date of Patent: Mar. 25, 2025

(54) READ SOURCE DETERMINATION (71) Applicant: Micron Technology, Inc., Boise, ID (US)

(72) Inventors: Tom V. Geukens, Longmont, CO (US); Byron D. Harris, Mead, CO (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 18/374,982

(22) Filed: Sep. 29, 2023

(65) Prior Publication Data

US 2024/0134551 A1 Apr. 25, 2024
US 2024/0231660 A9 Jul. 11, 2024

Related U.S. Application Data (60) Provisional application No. 63/418,141, filed on Oct. 21, 2022.

(51) Int. Cl.
*G06F 3/06* (2006.01)
(52) U.S. Cl.
CPC ............ *G06F 3/064* (2013.01); *G06F 3/0604* (2013.01); *G06F 3/0652* (2013.01); *G06F 3/0659* (2013.01); *G06F 3/0679* (2013.01)
(58) Field of Classification Search
CPC ...... G06F 3/064; G06F 3/0604; G06F 3/0652; G06F 3/0659; G06F 3/0679; G06F 3/061; G06F 3/0614; G06F 3/068; G11C 16/26; G11C 16/16; G11C 16/34
See application file for complete search history.

(56) References Cited

U.S. PATENT DOCUMENTS

| | | | |
|---|---|---|---|
| 10,732,877 B1* | 8/2020 | Gopalakrishnan | G11C 11/5642 |
| 11,687,290 B1* | 6/2023 | Huang | G11C 29/52 711/103 |
| 2017/0177258 A1 | 6/2017 | Bates et al. | |
| 2019/0102102 A1 | 4/2019 | Natarajan et al. | |
| 2019/0294358 A1 | 9/2019 | Suzuki et al. | |
| 2019/0361614 A1 | 11/2019 | Natarajan et al. | |
| 2020/0042223 A1 | 2/2020 | Li | |
| 2021/0149797 A1* | 5/2021 | Kanno | G06F 13/4068 |
| 2022/0300198 A1* | 9/2022 | Gao | G06F 11/3466 |

* cited by examiner

*Primary Examiner* — Khoa D Doan
(74) *Attorney, Agent, or Firm* — Brooks, Cameron & Huebsch, PLLC (57) ABSTRACT

Apparatuses and methods for read source determination are provided. One example apparatus can include a controller configured to determine a source for read requests and to direct read requests for a first portion of data to a first block of single level memory cells in response to an amount of a second portion of data written to a second block of single level memory cells being less than a threshold amount, and direct read requests for the first portion of data to a first block of quad level memory cells in response to the amount of the second portion of data written to the second block of single level memory cells being at least the threshold amount.

20 Claims, 6 Drawing Sheets

READ SOURCE DETERMINATION

PRIORITY INFORMATION

This application claims the benefit of U.S. Provisional Application No. 63/418,141, filed on Oct. 21, 2022, the contents of which are incorporated herein by reference.

TECHNICAL FIELD

The present disclosure relates generally to read operations, and more particularly, to apparatuses and methods for read source determination.

BACKGROUND

Memory devices are typically provided as internal, semiconductor, integrated circuits in computers or other electronic devices. There are many different types of memory including volatile and non-volatile memory. Volatile memory can require power to maintain its data and includes random-access memory (RAM), dynamic random access memory (DRAM), and synchronous dynamic random access memory (SDRAM), among others. Non-volatile memory can provide persistent data by retaining stored data when not powered and can include NAND flash memory, NOR flash memory, phase change random access memory (PCRAM), resistive random access memory (RRAM), and magnetic random access memory (MRAM), among others.

Memory devices can be combined together to form a solid state drive (SSD). An SSD can include non-volatile memory, e.g., NAND flash memory and/or NOR flash memory, and/or can include volatile memory, e.g., DRAM and/or SRAM, among various other types of non-volatile and volatile memory. Flash memory devices can include memory cells storing data in a charge storage structure such as a floating gate, for instance, and may be utilized as non-volatile memory for a wide range of electronic applications. Flash memory devices typically use a one-transistor memory cell that allows for high memory densities, high reliability, and low power consumption.

An SSD can be used to replace hard disk drives as the main storage volume for a computer, as the solid state drive can have advantages over hard drives in terms of performance, size, weight, ruggedness, operating temperature range, and power consumption. For example, SSDs can have superior performance when compared to magnetic disk drives due to their lack of moving parts, which may avoid seek time, latency, and other electro-mechanical delays associated with magnetic disk drives.

Memory is utilized as volatile and non-volatile data storage for a wide range of electronic applications. Non-volatile memory may be used in, for example, personal computers, portable memory sticks, digital cameras, cellular telephones, portable music players such as MP3 players, movie players, and other electronic devices. Memory cells can be arranged into arrays, with the arrays being used in memory devices.

Memory cells in an array architecture can be programmed to a desired state. For instance, electric charge can be placed on or removed from the charge storage structure, e.g., floating gate, of a memory cell to program the cell to a particular state. For example, a single level (memory) cell (SLC) can be programmed to one of two different states, each representing a different digit of a data value, e.g., a 1 or 0. Some flash memory cells can be programmed to one of more than two states corresponding to different particular data values, e.g., 1111, 0111, 0011, 1011, 1001, 0001, 0101, 1101, 1100, 0100, 0000, 1000, 1010, 0010, 0110, or 1110. Such cells may be referred to as multi state memory cells, multiunit cells, or multilevel (memory) cells (MLCs). MLCs can provide higher density memories without increasing the number of memory cells since each cell can be programmed to states corresponding to more than one digit, e.g., more than one bit of data.

DETAILED DESCRIPTION

The present disclosure provides apparatuses and methods for read source determination. One example apparatus can include a controller configured to direct read requests for a first portion of data to a first block of single level memory cells in response to an amount of a second portion of data written to a second block of single level memory cells being less than a threshold amount, and direct read requests for the first portion of data to a first block of quad level memory cells in response to the amount of the second portion of data written to the second block of single level memory cells being at least the threshold amount.

When a memory device receives write commands, the data may be written to both single level memory cells and to quad level cells. The data is written to the single level memory cells due to single level memory cells having faster write times, faster read times, and more reliable data when compared to quad level memory cells. The data is written to quad level memory cells due to quad level memory cells having more bit density per memory cells when compared to single level cells, so quad levels cells can store more data than single level cells. Once the data has been written to the quad level memory cells and is safe to read from the quad level memory cells, the data can be erased from the single level memory cells due to storage density of quad level memory cells being prioritized over the speed and reliability benefits of single level memory cells.

When quad level memory cells are preferred over single level memory cells, embodiments of the present disclosure can balance the desire to have the least amount of memory cells in a memory system or memory device configured as single level memory cells while still providing single level memory cells to store data when the speed and reliability benefits of single level memory cells are desirable.

When writing data to a memory system or memory device, data can be written to single level memory cells and to quad level memory cells. For example, data can be written to 4 single level blocks and to 1 quad level block, such that a first portion of data is written to a first single level block and to a first portion of a quad level block, a second portion of data is written to a second single level block and to a second portion of a quad level block, a third portion of data is written to a third single level block and to a third portion of a quad level block, and a fourth portion of data is written to a fourth single level block and to a fourth portion of a quad level block. The memory system can receive read requests for the data and can determine whether the read source for executing read requests is the single level blocks or the quad level block. The read source for read requests can initially be set to the single level blocks. The read source is the location in the memory system where the data is read from when executing a read request. The read source for read requests can then be updated as write operations progress while writing the data to the single level blocks and the quad level blocks.

A write request for data can be executed by writing a first portion of the data to a first single level block and a first portion of a quad level block. When writing the first portion of the data to the first single level block and the first portion of a quad level block, the read source for read requests for the first portion of the data can be the first single level block, as opposed to the first portion of the quad level block because the write operation in the first portion of the quad level block may not be complete and/or the data in the first portion of the quad level block may be too fresh (e.g., too recently written) to be read reliably.

As the write operation completes writing the first portion of data to the first single level block and the first portion of the quad level block and begins writing a second portion of data to a second single level block and to a second portion of the quad level block, the read source for the first portion of the data remains in the first single level block, as opposed to the first portion of the quad level block because the write operation in the first portion of the quad level block still may not be complete and/or the data in the first portion of the quad level block may be too fresh to be read reliably. When writing the second portion of data to the second single level block and to the second portion of the quad level block, the read source for the second portion of the data can be in the second single level block, as opposed to the second portion of the quad level block because the write operation in the second portion of the quad level block may not be complete and/or the data in the second portion of the quad level block may be too fresh to be read reliably.

Once the write operations have progressed to a point where at least a threshold amount, for example 25%, of the second portion of data has been written to the second single level block, the read source for the first portion of data can be updated to the first portion of the quad level block. The read source for the first portion of data can be updated to the first portion of the quad level block due to writing the threshold amount of the second portion of data in the second single level block which allows for the write operation in the first portion of the quad level block to be complete and/or for enough time to have passed since the first portion of data was written in the first portion of the quad level block to allow for the first portion of data to be read reliably from the first portion of the quad level block. In response to updating the read source for the first portion of data from the first single level block to the first portion of the quad level block, the first single level block can be designated as ready for erasing so it can be erased and used for writing another portion of data.

As the write operations complete writing the second portion of data to the second single level block and begins writing a third portion of data to a third single level block and to a third portion of the quad level block, the read source for the second portion of the data remains the second single level block, as opposed to the second portion of the quad level block, because the write operation in the second portion of the quad level block still may not be complete and/or the data in the second portion of the quad level block may be too fresh to be read reliably. When writing the third portion of data to the third single level block and to the third portion of the quad level block, the read source for the third portion of the data can be the third single level block, as opposed to the third portion of the quad level block because the write operation in the third portion of the quad level block may not be complete and/or the data in the third portion of the quad level block may be too fresh to be read reliably.

Once the write operations have progressed to a point where at least a threshold amount, for example 25%, of the third portion of data has been written to the third single level block, the read source for the second portion of data can be updated to the second portion of the quad level block. The read source for the second portion of data can be updated to the second portion of the quad level block due to writing the threshold amount of the third portion of data in the second single level block allowing for the write operation in the second portion of the quad level block to be complete and/or for enough time to have passed since the second portion of data was written in the second portion of the quad level block to allow for the second portion of data to be read reliably from the second portion of the quad level block. In response to updating the read source for the second portion of data from the second single level block to the second portion of the quad level block, the second single level block can be designated as ready for erasing so it can be erased and used for writing another portion of data.

As the write operation completes writing the third portion of data to the third single level block and begins writing a fourth portion of data to a fourth single level block and to a fourth portion of the quad level block, the read source for the third portion of the data remains the third single level block, as opposed to the third portion of the quad level block because the write operation in the third portion of the quad level block still may not be complete and/or the data in the third portion of the quad level block may be too fresh to be read reliably.

Once the write operations have progressed to a point where at least a threshold amount, for example 25%, of the fourth portion of data has been written to the fourth single level block, the read source for the third portion of data can be updated to the third portion of the quad level block. The read source for the third portion of data can be updated to the third portion of the quad level block due to writing the threshold amount of the fourth portion of data in the fourth single level block allowing for the write operation in the third portion of the quad level block to be complete and/or for enough time to have passed since the third portion of data was written in the third portion of the quad level block to allow for the third portion of data to be read reliably from the third portion of the quad level block. In response to updating the read source for the third portion of data from the third single level block to the third portion of the quad level block, the third single level block can be designated as ready for erasing so it can be erased and used for writing another portion of data.

When writing the fourth portion of data to the fourth single level block and to the fourth portion of the quad level block, the read source for the fourth portion of the data can be the fourth single level block, as opposed to the fourth portion of the quad level block because the write operation in the fourth portion of the quad level block may not be complete and/or the data in the fourth portion of the quad level block may be too fresh to be read reliably.

Once the write operations have completed writing the fourth portion of data to the fourth portion of the quad level block and/or enough time to has passed since the fourth portion of data was written in the fourth portion of the quad level block to allow for the fourth portion of data to be read reliably from the fourth portion of the quad level block, the read source for the fourth portion of data can be updated to the fourth portion of the quad level block. In response to updating the read source for the fourth portion of data from the fourth single level block to the fourth portion of the quad level block, the fourth single level block can be designated as ready for erasing so it can be erased and used for writing another portion of data.

In the following detailed description of the present disclosure, reference is made to the accompanying drawings that form a part hereof, and in which is shown by way of illustration how a number of embodiments of the disclosure may be practiced. These embodiments are described in sufficient detail to enable those of ordinary skill in the art to practice the embodiments of this disclosure, and it is to be understood that other embodiments may be utilized and that process, electrical, and/or structural changes may be made without departing from the scope of the present disclosure.

As used herein, "a number of" something can refer to one or more such things. For example, a number of memory cells can refer to one or more memory cells. Additionally, the designators "M" and "N" as used herein, particularly with respect to reference numerals in the drawings, indicates that a number of the particular feature so designated can be included with a number of embodiments of the present disclosure.

The figures herein follow a numbering convention in which the first bit or bits correspond to the drawing figure number and the remaining bits identify an element or component in the drawing. Similar elements or components between different figures may be identified by the use of similar bits. For example, 100 may reference element "00" in FIG. 1, and a similar element may be referenced as 600 in FIG. 6. Elements shown in the various embodiments herein can be added, exchanged, and/or eliminated so as to provide a number of additional embodiments of the present disclosure. In addition, the proportion and the relative scale of the elements provided in the figures are intended to illustrate the embodiments of the present disclosure, and should not be taken in a limiting sense.

Figure 1:
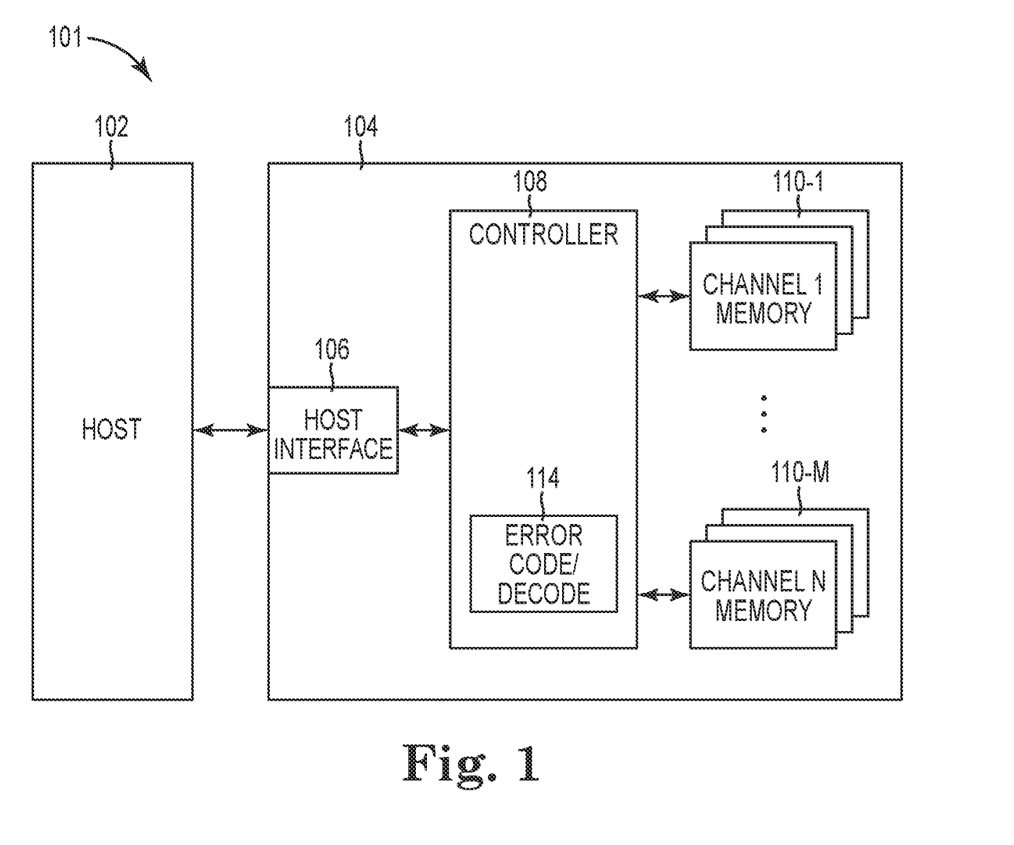
FIG. 1 is a block diagram of an apparatus in the form of a computing system including at least one memory system in accordance a number of embodiments of the present disclosure.

FIG. 1 is a block diagram of an apparatus in the form of a computing system 101 including at least one memory system 104 in accordance with a number of embodiments of the present disclosure. As used herein, a memory system 104, a controller 108, or a memory device 110 might also be separately considered an "apparatus". The memory system 104 can be a solid state drive (SSD), for instance, and can include a host interface 106, a controller 108, e.g., a processor and/or other control circuitry, and a number of memory devices 110-1, . . . , 110-M, e.g., solid state memory devices such as NAND flash devices, which provide a storage volume for the memory system 104. In a number of embodiments, the controller 108, a memory device 110-1 to 110-M, and/or the host interface 106 can be physically located on a single die or within a single package, e.g., a managed NAND application. Also, in a number of embodiments, a memory, e.g., memory devices 110-1 to 110-M, can include a single memory device.

Memory devices 110-1 to 110-M can be configured to store single level memory cells (SLCs) that can store 1 bit per memory cells, multi-level memory cells (MLCs) that can store 2 bits per memory cell, triple level memory cells (TLC) that can store 3 bits per memory cell, and/or quad level memory cells (QLCs) that can store 4 bits per memory cells, among other types of memory cells with various it storage levels. In some embodiments, each of the memory devices 110-1 to 110-M can include one or more arrays of memory cells such as SLCs, MLCs, TLCs, QLCs, or any combination of such. In some embodiments, a particular memory device can include an SLC portion, and an MLC portion, a TLC portion, and/or a QLC portion of memory cells. The memory cells of the memory devices 110-1 to 110-M can be grouped as pages that can refer to a logical unit of the memory device used to store data. Memory devices 110-1 to 110-M can be configured to store data in a single type of memory cells, such as SLCs, MLCs, TLCs, or QLCs. Memory devices 110-1 to 110-M can be configured to store data in a multiple types of memory cells, such as SLCs, MLCs, TLCs, or QLCs, where each block in a particular memory device is configured to store data in a particular type of memory cell and the particular memory device can have blocks of memory cells storing any combination of SLCs, MLCs, TLCs, or QLCs.

As illustrated in FIG. 1, the controller 108 can be coupled to the host interface 106 and to the memory devices 110-1, . . . , 110-M via a plurality of channels and can be used to transfer data between the memory system 104 and a host 102. The interface 106 can be in the form of a standardized interface. For example, when the memory system 104 is used for data storage in a computing system 100, the interface 106 can be a serial advanced technology attachment (SATA), peripheral component interconnect express (PCIe), or a universal serial bus (USB), among other connectors and interfaces. In general, however, interface 106 can provide an interface for passing control, address, data, and other signals between the memory system 104 and a host 102 having compatible receptors for the interface 106.

Host 102 can be a host system such as a personal laptop computer, a desktop computer, a digital camera, a mobile telephone, or a memory card reader, among various other types of hosts. Host 102 can include a system motherboard and/or backplane and can include a number of memory access devices, e.g., a number of processors.

The controller 108 can communicate with the memory devices 110-1, . . . 110-M to control data read, write, and erase operations, among other operations. The controller 108 can include, for example, a number of components in the form of hardware and/or firmware, e.g., one or more integrated circuits, and/or software for controlling access to the number of memory devices 110-1, . . . , 110-M and/or for facilitating data transfer between the host 102 and memory devices 110-1, . . . , 110-M. For instance, in the example illustrated in FIG. 1, the controller 108 includes an error correcting code encoder/decode component 114. However, the controller 108 can include various other components not illustrated so as not to obscure embodiments of the present disclosure. Also, the component 114 may not be components of controller 108, in some embodiments, e.g., component 114 can be independent components.

The error correcting code/decode component 114 can be an LDPC encoder/decoder, for instance, which can encode/decode user data transferred between host 102 and the memory devices 110-1, . . . , 110-M.

The memory devices 110-1, . . . , 110-M can include a number of arrays of memory cells. The arrays can be flash arrays with a NAND architecture, for example. However, embodiments are not limited to a particular type of memory array or array architecture. The memory cells can be grouped, for instance, into a number of blocks including a number of physical pages. A number of blocks can be included in a plane of memory cells and an array can include a number of planes. As one example, a memory device may be configured to store 8 KB (kilobytes) of user data per page, 128 pages of user data per block, 2048 blocks per plane, and 16 planes per device.

Figure 2:
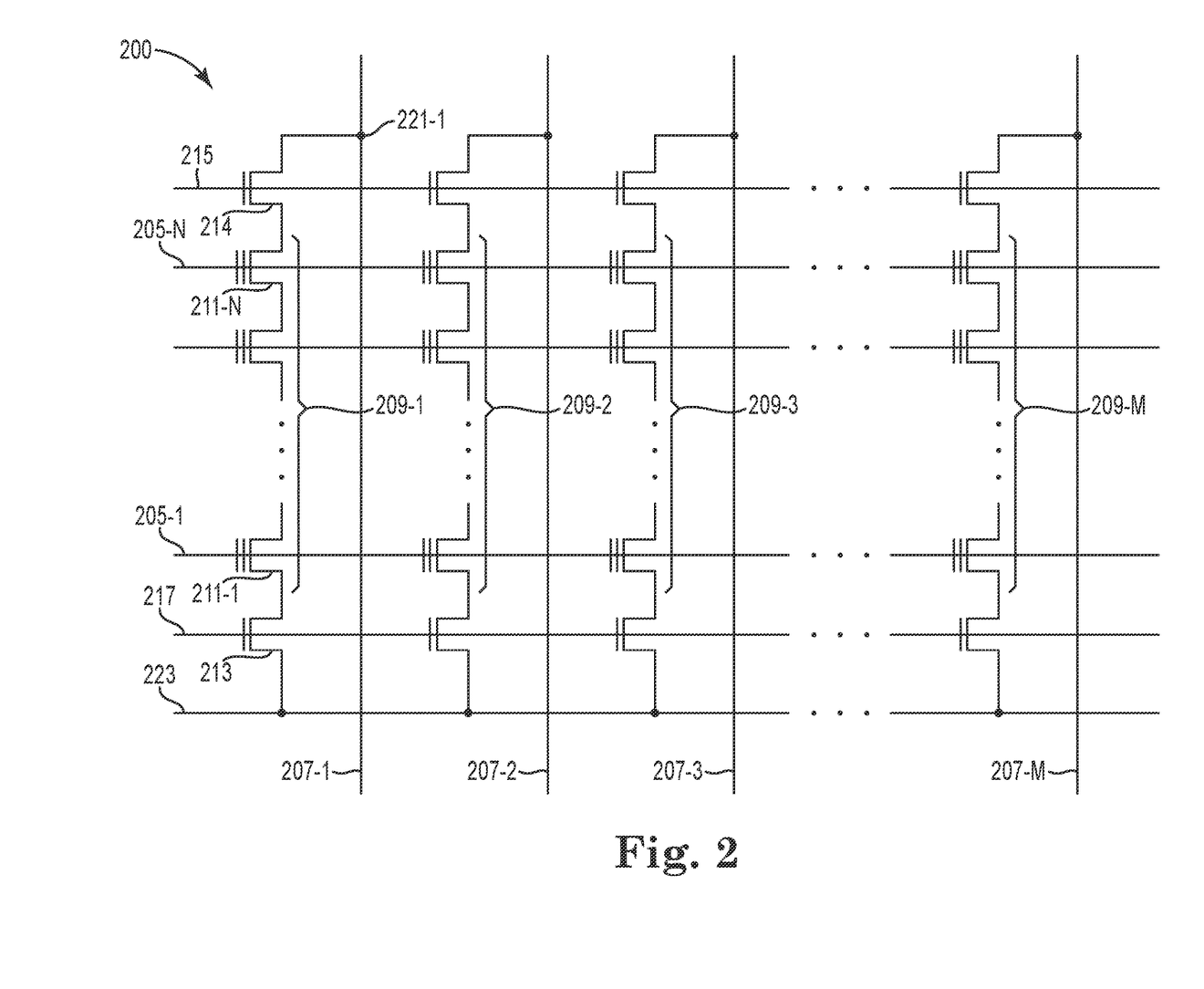
FIG. 2 illustrates a schematic diagram of a portion of a non-volatile memory array in accordance with a number of embodiments of the present disclosure.

FIG. 2 illustrates a schematic diagram of a portion of a non-volatile memory array 200 in accordance with a number of embodiments of the present disclosure. The embodiment of FIG. 2 illustrates a NAND architecture non-volatile memory array, e.g., NAND Flash. However, embodiments described herein are not limited to this example. As shown in FIG. 2, memory array 200 includes access lines, e.g., word lines 205-1, . . . , 205-N, and intersecting data lines, e.g., local bit lines, 207-1, 207-2, 207-3, . . . 207-M. For ease of addressing in the digital environment, the number of word lines 205-1, . . . , 205-N and the number of local bit lines 207-1, 207-2, 207-3, . . . , 207-M can be some power of two, e.g., 256 word lines by 4,096 bit lines.

Memory array 200 includes NAND strings 209-1, 209-2, 209-3, . . . , 209-M. Each NAND string includes non-volatile memory cells 211-1, . . . , 211-N, each communicatively coupled to a respective word line 205-1, . . . , 205-N. Each NAND string (and its constituent memory cells) is also associated with a local bit line 207-1, 207-2, 207-3, . . . , 207-M. The non-volatile memory cells 211-1, . . . , 211-N of each NAND string 209-1, 209-2, 209-3, . . . , 209-M are connected in series source to drain between a source select gate (SGS), e.g., a field-effect transistor (FET), 213, and a drain select gate (SGD), e.g., FET, 214. Each source select gate 213 is configured to selectively couple a respective NAND string to a common source 223 responsive to a signal on source select line 217, while each drain select gate 214 is configured to selectively couple a respective NAND string to a respective bit line responsive to a signal on drain select line 215.

As shown in the embodiment illustrated in FIG. 2, a source of source select gate 213 is connected to a common source line 223. The drain of source select gate 213 is connected to the source of the memory cell 211-1 of the corresponding NAND string 209-1. The drain of drain select gate 214 is connected to bit line 207-1 of the corresponding NAND string 209-1 at drain contact 221-1. The source of drain select gate 214 is connected to the drain of the last memory cell 211-N, e.g., a floating-gate transistor, of the corresponding NAND string 409-1.

In a number of embodiments, construction of non-volatile memory cells 211-1, . . . , 211-N includes a source, a drain, a charge storage structure such as a floating gate, and a control gate. Non-volatile memory cells 211-1, . . . , 211-N have their control gates coupled to a word line, 205-1, . . . , 205-N respectively. A "column" of the non-volatile memory cells, 211-1, . . . , 211-N, make up the NAND strings 209-1, 209-2, 209-3, . . . , 209-M, and are coupled to a given local bit line 207-1, 207-2, 207-3, . . . , 207-M, respectively. A "row" of the non-volatile memory cells are those memory cells commonly coupled to a given word line 205-1, . . . , 205-N. The use of the terms "column" and "row" is not meant to imply a particular linear, e.g., vertical and/or horizontal, orientation of the non-volatile memory cells. A NOR array architecture would be similarly laid out, except that the string of memory cells would be coupled in parallel between the select gates.

Subsets of cells coupled to a selected word line, e.g., 205-1, . . . , 2105-N, can be programmed and/or read together as a page of memory cells. A programming operation, e.g., a write operation, can include applying a number of program pulses, e.g., 16V-20V, to a selected word line in order to increase the threshold voltage (Vt) of selected cells coupled to that selected access line to a desired program voltage level corresponding to a target, e.g., desired, state, e.g., charge storage state. State is equivalently referred to as "level" herein.

A read operation, which can also refer to a program verify operation, can include sensing a voltage and/or current change of a bit line coupled to a selected cell in order to determine the state of the selected cell. The states of a particular fractional bit memory cell may not correspond directly to a data value of the particular memory cell, rather the states of a group of memory cells including the particular memory cell together map to a data value having an integer number of bits. The read operation can include pre-charging a bit line and detecting the discharge when a selected cell begins to conduct.

Determining, e.g., detecting, the state of a selected cell can include providing a number of sensing signals, e.g., read voltages, to a selected word line while providing a number of voltages, e.g., read pass voltages, to the word lines coupled to the unselected cells of the string sufficient to place the unselected cells in a conducting state independent of the threshold voltage of the unselected cells. The bit line corresponding to the selected cell being read and/or verified can be detected to determine whether or not the selected cell conducts in response to the particular sensing signal applied to the selected word line. For example, the state of a selected cell can be determined by the word line voltage at which the bit line current reaches a particular reference current associated with a particular state.

SLCs can be one-bit, e.g., two-state, memory cells, or store more than two bits of data per memory cell, including fractional bits of data per memory cell. For example, a one-bit memory cell can be programmed to one of two states, e.g., P0 and P1, respectively. In operation, a number of memory cells, such as in a selected block, can be programmed such that they have a Vt level corresponding to either P0 or P1. As an example, state P0 can represent a stored data value such as binary "1". State P1 can represent a stored data value such as binary "0". However, embodiments are not limited to these data value correspondence.

QLCs can be four-bit, e.g., 16-state, memory cells, or store more than two bits of data per memory cell, including fractional bits of data per memory cell. For example, a four-bit memory cell can be programmed to one of 16 states, e.g., P0, P1, P2, P3, P4, P5, P6, P7, P8, P9, P10, P11, P12, P13, P14, and P15, respectively. In operation, a number of memory cells, such as in a selected block, can be programmed such that they have a Vt level corresponding to either P0, P1, P2, P3, P4, P5, P6, P7, P8, P9, P10, P11, P12, P13, P14, or P15. As an example, state P0 can represent a stored data value such as binary "1111". State P1 can represent a stored data value such as binary "1110". State P2 can represent a stored data value such as binary "1101". State P3 can represent a stored data value such as binary "1100". State P4 can represent a stored data value such as binary "1011". State P5 can represent a stored data value such as binary "1010". State P6 can represent a stored data value such as binary "1001". State P7 can represent a stored data value such as binary "1000". State P8 can represent a stored data value such as binary "0111". State P9 can represent a stored data value such as binary "0110". State P10 can represent a stored data value such as binary "0101". State P11 can represent a stored data value such as binary "0100". State P12 can represent a stored data value such as binary "0011". State P13 can represent a stored data value such as binary "0010". State P14 can represent a stored data value such as binary "0001". State P15 can represent a stored data value such as binary "0000". However, embodiments are not limited to these data value correspondence.

Figure 3:
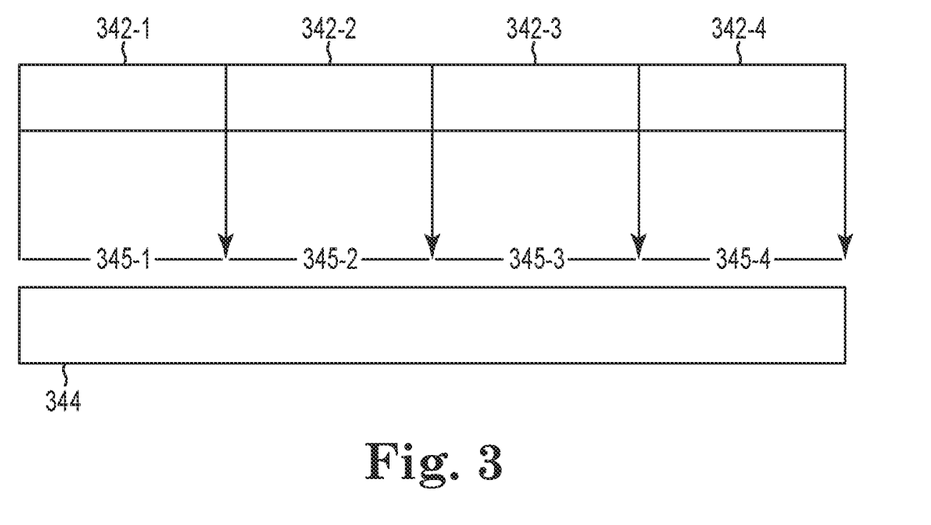
FIG. 3 illustrates a diagram of single level blocks of memory cells and quad level blocks of memory cells in accordance with an embodiment of the present disclosure.

FIG. 3 illustrates a diagram of single level blocks of memory cells and quad level blocks of memory cells in accordance with an embodiment of the present disclosure. When writing data to a memory system or memory device, data can be written to single level memory cells and to quad level memory cells. In FIG. 3, when writing data to a memory device or devices in a memory system, data can be written to 4 single level blocks 342-1, 342-2, 342-3, and 342-4 and to 1 quad level block 344. A first portion of data is written to a first single level block 342-1 and to a first portion of a quad level block 345-1. A second portion of data is written to a second single level block 342-2 and to a second portion of a quad level block 345-2. A third portion of data is written to a third single level block 342-3 and to a third portion of a quad level block 345-3. A fourth portion of data is written to a fourth single level block 342-4 and to a fourth portion of a quad level block 345-4. The memory system can receive read requests for the data and can determine whether the read source for executing read requests is the single level blocks 342-1, 342-2, 342-3, and 342-4 or one of the portions 345-1, 345-2, 345-3, and 345-4 the quad level block 344. The read source for read requests can initially be set to the single level blocks 342-1, 342-2, 342-3, and 342-4. The read source for read requests can then be updated as write operations progress while writing the data to the single level blocks 342-1, 342-2, 342-3, and 342-4 and the quad level block 344.

FIGS. 4A-4H are diagrams illustrating a method for determining a read source for read requests in accordance with a number of embodiments of the present disclosure. In FIG. 4A-4H data is being written to first single level block 442-1, second single level block 442-2, third single level block 442-3, fourth single level block 442-4, and quad level block 444, such that a first portion of data is written to first single level block 442-1 is also written to a first portion of quad level block 444, a second portion of data is written to second single level block 442-2 is also written to a second portion of quad level block 444, a third portion of data is written to third single level block 442-3 is also written to a third portion of quad level block 444, and a fourth portion of data is written to fourth single level block 442-4 is also written to a fourth portion of quad level block 444.

Figure 4A:
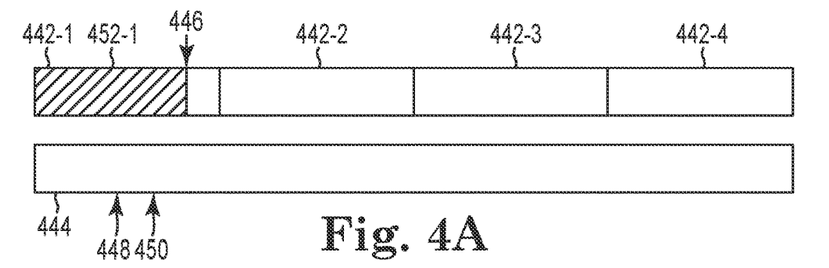
FIGS. 4A-4H are diagrams illustrating a method for determining a read source for read requests in accordance with a number of embodiments of the present disclosure.

In FIG. 4A, write operations are writing data to single level block 442-1 and to a first portion of quad level block 444. Single level write cursor 446 indicates the progress of the write operations in single level block 442-1 and fine quad level write cursor 448 and course quad level write cursor 450 indicate the progress of the write operations in quad level block 444. Since the write operation illustrated in FIG. 4A is still writing a first portion of data to single level block 442-1 and to quad level block 444, the read source for the first portion of data 452-1 is single level block 442-1. When writing a first portion of data to single level block 442-1 and to a first portion of quad level block 444, the read source for read requests for the first portion of the data 452-1 can be first single level block 442-1, as opposed to the first portion of quad level block 444, because the write operation in the first portion of the quad level block 444 is not be complete as indicated by fine quad level write cursor 448 and course quad level write cursor 450 and/or the data in the first portion of the quad level block 444 may be too fresh (e.g., too recently written) to be read reliably.

Figure 4B:
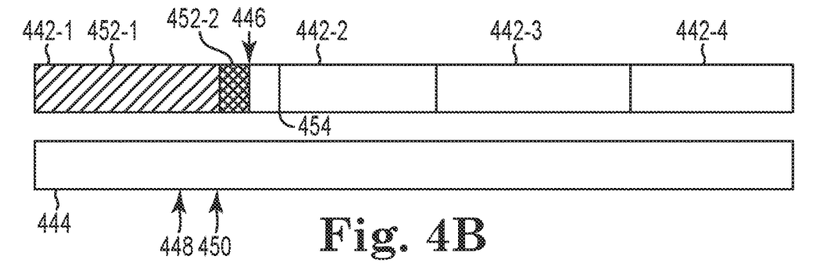

In FIG. 4B, write operations have completed writing a first portion of data to single level block 442-1, are still writing the first portion of data to a first portion of quad level block 44, and has begun writing a second portion of data to second single level block 442-2. Single level write cursor 446 indicates the progress of the write operations in single level block 442-2 and fine quad level write cursor 448 and course quad level write cursor 450 indicate the progress of the write operation in quad level block 444, where course write operations in the first portion of quad level block 444 have completed and fine write operations in the first portion of quad level block 44 are still on going. Since the write operations illustrated in FIG. 4B have written less than a threshold 454 amount of data to single level block 442-2 as indicated by single level write cursor 446 (e.g., single level write cursor 446 has not passed the threshold 454 indicator), the read source for the first portion of data 452-1 is single level block 442-1 and the read source for the second portion of data 452-2 is single level block 442-2. When the write operations have completed writing the first portion of data to single level block 442-1 and have begun writing a second portion of data to single level block 442-2, the read source for the first portion of the data remains the single level block 444-1, as opposed to the first portion of the quad level block 44 because the write operations in the first portion of the quad level block 444 still may not be complete (e.g., the fine programming operations have not been completed as indicated by fine quad level write cursor 448) and/or the data in the first portion of the quad level block 444 may be too fresh to be read reliably.

Figure 4C:
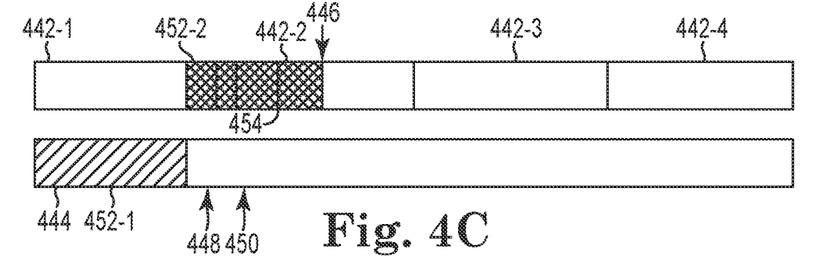

In FIG. 4C, write operations have completed writing a first portion of data to a first portion of quad level block 444 and are still writing the second portion of data to single level block 442-2. Single level write cursor 446 indicates the progress of the write operations in single level block 442-2 and fine quad level write cursor 448 and course quad level write cursor 450 indicate the progress of the write operations in quad level block 444, where course and fine write operations in the second portion of quad level block 444 have started and write operations in single level block 442-2 have progressed past threshold 454. Since the write operations illustrated in FIG. 4C have written more than a threshold 454 amount of data to single level block 442-2 as indicated by single level write cursor 446 (e.g., single level write cursor 446 has passed the threshold 454 indicator), the read source for the first portion of data 452-1 can be updated to the first portion of quad level block 444. The read source for the second portion of data 452-2 can be single level block 442-2.

Once the write operations have progressed to a point where at least a threshold amount, for example 25%, of the second portion of data has been written to single level block 442-2, the read source for the first portion of data 452-1 can be updated to the first portion of the quad level block 444. The read source for the first portion of data 452-1 can be updated to the first portion of the quad level block 444 due to writing the threshold amount of the second portion of data in single level block 442-2 allowing for the write operation in the first portion of the quad level block 444 to be complete and/or for enough time to have passed since the first portion of data was written in the first portion of the quad level block 444 to allow for the first portion of data to be read reliably from the first portion of the quad level block. In response to updating the read source for the first portion of data 452-1 from the single level block 442-1 to the first portion of the quad level block 444, single level block 442-1 can be designated as ready for erasing so it can be erased and used to for writing another portion of data.

Figure 4D:
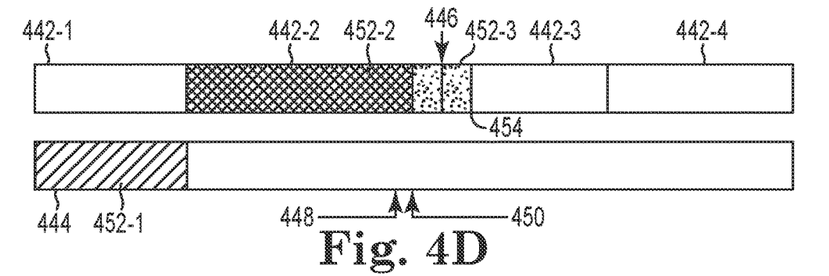

In FIG. 4D, write operations have completed writing a second portion of data to single level block 442-2, are still writing the second portion of data to a second portion of quad level block 444, and has begun writing a third portion of data to single level block 442-3. Single level write cursor 446 indicates the progress of the write operations in single level block 442-3 and fine quad level write cursor 448 and course quad level write cursor 450 indicate the progress of the write operation in quad level block 444, where course write operations in the second portion of quad level block 444 have completed and fine write operations in the second portion of quad level block 444 are still ongoing. Since the write operations illustrated in FIG. 4D have written less than a threshold 454 amount of data to single level block 442-3 as indicated by single level write cursor 446 (e.g., single level write cursor 446 has not passed the threshold 454 indicator), the read source for the second portion of data 452-2 is single level block 442-2 and the read source for the third portion of data 452-3 is single level block 442-3. When the write operations have completed writing the second portion of data to single level block 442-2 and have begun writing a third portion of data to single level block 442-3, the read source for the first portion of the data 452-2 remains single level block 444-2, as opposed to the second portion of the quad level block 444 because the write operations in the second portion of the quad level block 44 still may not be complete (e.g., the fine programming operations have not been completed as indicated by fine quad level write cursor 448) and/or the data in the second portion of the quad level block 444 may be too fresh to be read reliably.

Figure 4E:
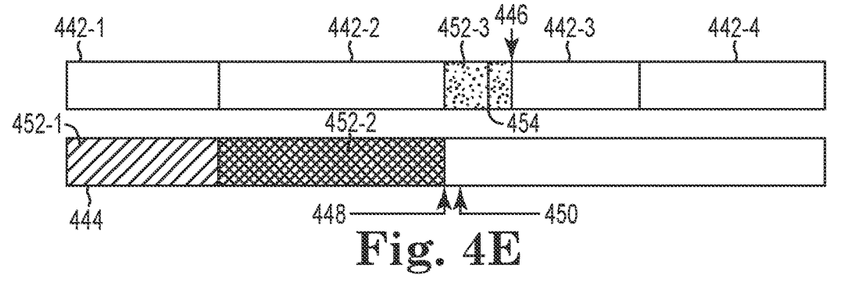

In FIG. 4E, write operations have completed writing a second portion of data to a second portion of quad level bock 444 and are still writing the third portion of data to single level block 442-3. Single level write cursor 446 indicates the progress of the write operations in single level block 442-3 and fine quad level write cursor 448 and course quad level write cursor 450 indicate the progress of the write operations in quad level block 444, where course and fine write operations in the third portion of quad level block 444 have started and write operations in single level block 442-3 have progressed past threshold 454. Since the write operations illustrated in FIG. 4E have written more than a threshold 454 amount of data to single level block 442-3 as indicated by single level write cursor 446 (e.g., single level write cursor 446 has passed the threshold 454 indicator), the read source for the second portion of data 452-2 can be updated to the second portion of quad level block 444. The read source for the third portion of data 452-3 can be single level block 442-3.

Once the write operations have progressed to a point where at least a threshold amount, for example 25%, of the third portion of data has been written to single level block 442-3, the read source for the second portion of data 452-2 can be updated to the second portion of the quad level block 444. The read source for the second portion of data 452-2 can be updated to the second portion of the quad level block 444 due to writing the threshold amount of the third portion of data in single level block 442-3 allowing for the write operations in the second portion of the quad level block 444 to be complete and/or for enough time to have passed since the second portion of data was written in the second portion of the quad level block 444 to allow for the second portion of data to be read reliably from the second portion of the quad level block 444. In response to updating the read source for the second portion of data 452-2 from the single level block 442-2 to the second portion of the quad level block 444, single level block 442-2 can be designated as ready for erasing so it can be erased and used to for writing another portion of data.

Figure 4F:
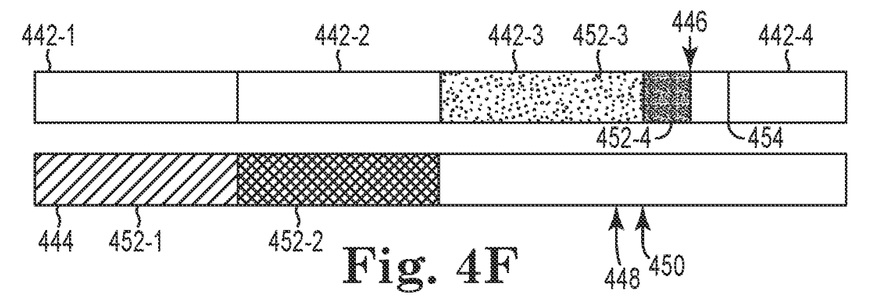

In FIG. 4F, write operations have completed writing a third portion of data to single level block 442-3, are still writing the third portion of data to a third portion of quad level block 444, and has begun writing a fourth portion of data to single level block 442-4. Single level write cursor 446 indicates the progress of the write operations in single level block 442-4 and fine quad level write cursor 448 and course quad level write cursor 450 indicate the progress of the write operation in quad level block 444, where course write operations in the third portion of quad level block 444 have completed and fine write operations in the third portion of quad level block 444 are still on going. Since the write operations illustrated in FIG. 4F have written less than a threshold 454 amount of data to single level block 442-4 as indicated by single level write cursor 446 (e.g., single level write cursor 446 has not passed the threshold 454 indicator), the read source for the third portion of data 452-3 is single level block 442-3 and the read source for the fourth portion of data 452-4 is single level block 442-4. When the write operations have completed writing the third portion of data to single level block 442-3 and have begun writing a fourth portion of data to single level block 442-3, the read source for the third portion of the data 452-3 remains single level block 444-3, as opposed to the third portion of the quad level block 444 because the write operations in the third portion of the quad level block 44 still may not be complete (e.g., the fine programming operations have not been completed as indicated by fine quad level write cursor 448) and/or the data in the third portion of the quad level block 444 may be too fresh to be read reliably.

Figure 4G:
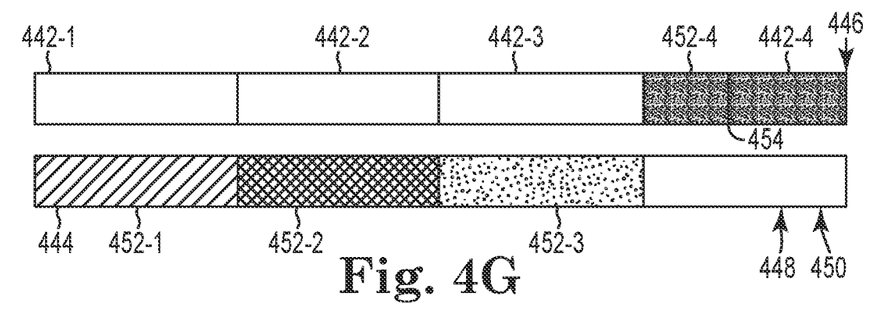

In FIG. 4G, write operations have completed writing a third portion of data to a third portion of quad level bock 444, have begun writing the fourth portion of data to a fourth portion of quad level block 444, and have completed writing the fourth portion of data to single level block 442-4. Single level write cursor 446 indicates the progress of the write operations in single level block 442-4 and fine quad level write cursor 448 and course quad level write cursor 450 indicate the progress of the write operations in quad level block 444, where course and fine write operations in the fourth portion of quad level block 444 have started and write operations in single level block 442-4 are complete and have progressed past threshold 454. Since the write operations illustrated in FIG. 4G have written more than a threshold 454 amount of data to single level block 442-4 as indicated by single level write cursor 446 (e.g., single level write cursor 446 has passed the threshold 454 indicator), the read source for the third portion of data 452-3 can be updated to the third portion of quad level block 444. The read source for the fourth portion of data 452-4 can be single level block 442-4.

Once the write operations have progressed to a point where at least a threshold amount, for example 25%, of the fourth portion of data has been written to single level block 442-4, the read source for the third portion of data 452-3 can be updated to the third portion of the quad level block 444. The read source for the third portion of data 452-3 can be updated to the third portion of the quad level block 444 due to writing the threshold amount of the fourth portion of data in single level block 442-4 allowing for the write operations in the third portion of the quad level block 444 to be complete and/or for enough time to have passed since the third portion of data was written in the third portion of the quad level block 444 to allow for the third portion of data to be read reliably from the third portion of the quad level block 444. In response to updating the read source for the third portion of data 452-3 from the single level block 442-3 to the third portion of the quad level block 444, single level block 442-3 can be designated as ready for erasing so it can be erased and used to for writing another portion of data.

Figure 4H:
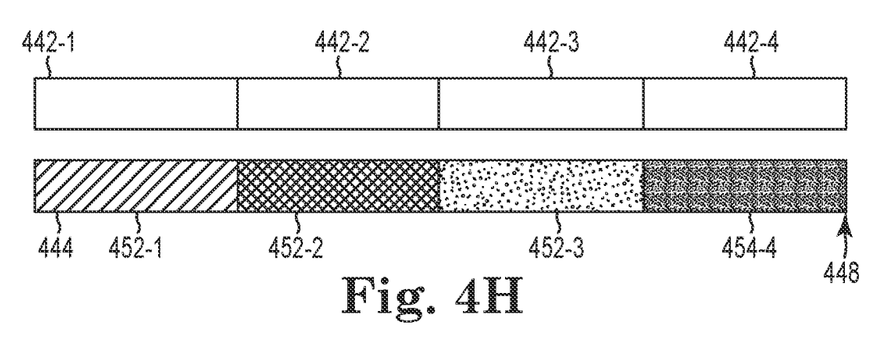

In FIG. 4H, write operations have completed writing a fourth portion of data to a fourth portion of quad level bock 444 and have completed writing the fourth portion of data to single level block 442-4. Single level write cursor 446 indicates the progress of the write operations in single level block 442-4 and fine quad level write cursor 448 and course quad level write cursor 450 indicate the progress of the write operations in quad level block 444, where course and fine write operations in the fourth portion of quad level block 444 have completed and write operations in single level block 442-4 are complete. Since the write operations illustrated in FIG. 4H have completed course and fine write operations in the fourth portion of quad level block 444 (e.g., fine quad level write cursor 448 is at the end of quad level block 444), the read source for the fourth portion of data 452-4 can be updated to the fourth portion of quad level block 444. In response to updating the read source for the fourth portion of data 452-4 from the single level block 442-4 to the fourth portion of the quad level block 444, single level block 442-4 can be designated as ready for erasing so it can be erased and used to for writing another portion of data.

Figure 5:
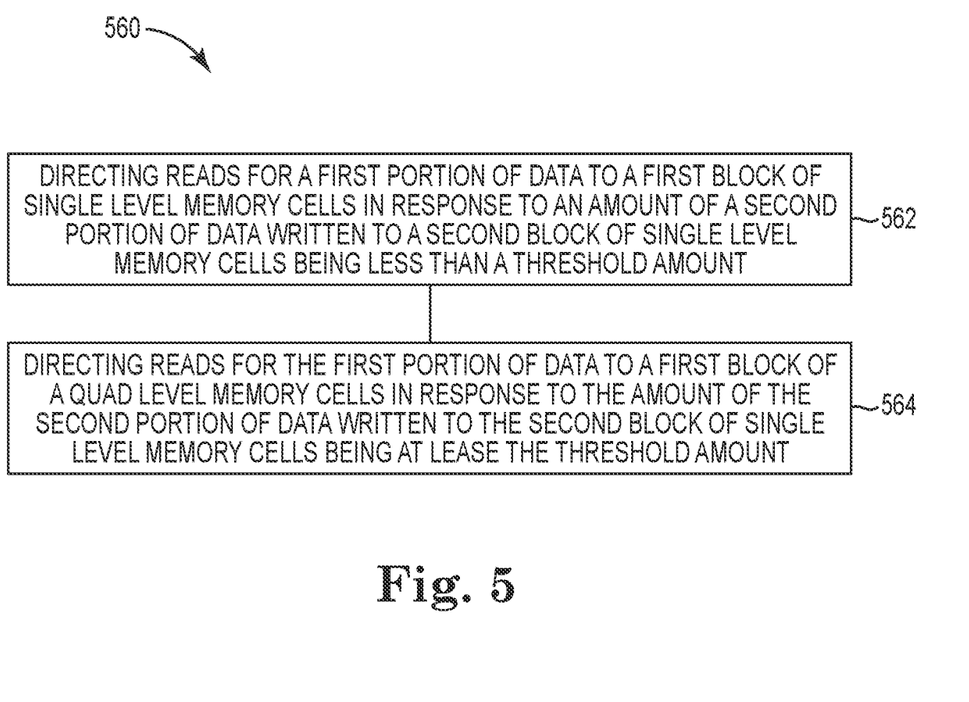
FIG. 5 is a flow diagram a method for read source determination in accordance with a number of embodiments of the present disclosure.

FIG. 5 is a flow diagram a method for read source determination 560 in accordance with a number of embodiments of the present disclosure.

At 562, the method can include directing reads for a first portion of data to a first block of single level memory cells in response to an amount of a second portion of data written to a second block of single level memory cells being less than a threshold amount.

The read source for a first portion of data that is being written to a first single level block can be the first single level block and the read source for the first portion of data can be the first single level block when less than a threshold amount, such as 25%, of a second portion of data has been written to a second single level block.

At 564, the method can include directing reads for the first portion of data to a first block of a quad level memory cells in response to the amount of the second portion of data written to the second block of single level memory cells being at least the threshold amount.

The read source for the first portion of data can be the first portion of the quad level block when at least a threshold amount, such as 25%, of the second portion of data has been written to a second single level block.

Although specific embodiments have been illustrated and described herein, those of ordinary skill in the art will appreciate that an arrangement calculated to achieve the same results can be substituted for the specific embodiments shown. This disclosure is intended to cover adaptations or variations of various embodiments of the present disclosure. It is to be understood that the above description has been made in an illustrative fashion, and not a restrictive one. Combination of the above embodiments, and other embodiments not specifically described herein will be apparent to those of skill in the art upon reviewing the above description. The scope of the various embodiments of the present disclosure includes other applications in which the above structures and methods are used. Therefore, the scope of various embodiments of the present disclosure should be determined with reference to the appended claims, along with the full range of equivalents to which such claims are entitled.

In the foregoing Detailed Description, various features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. An apparatus, comprising:
   an array of memory cells;
   a controller coupled to the array of memory cells, wherein the controller is configured to determine a source for read requests and to:
   direct read requests for a first portion of data to a first block of single level memory cells in response to an amount of a second portion of data written to a second block of single level memory cells being less than a threshold amount; and
   direct read requests for the first portion of data to a first block of a quad level memory cells in response to the amount of the second portion of data written to the second block of single level memory cells being at least the threshold amount.

2. The apparatus of claim 1, wherein the threshold amount is one quarter of the second portion of data being written to the second block of single level memory cells.

3. The apparatus of claim 1, direct read requests for a second portion of data to a second block of single level memory cells in response to an amount of a third portion of data written to a third block of single level memory cells being less than the threshold amount.

4. The apparatus of claim 3, direct read requests for the second portion of data to a first block of a quad level memory cells in response to the amount of the third portion of data written to the third block of single level memory cells being at least the threshold amount.

5. The apparatus of claim 4, direct read requests for a third portion of data to a third block of single level memory cells in response to an amount of a fourth portion of data written to a fourth block of single level memory cells being less than the threshold amount.

6. The apparatus of claim 5, direct read requests for the third portion of data to a first block of a quad level memory cells in response to the amount of the fourth portion of data written to the fourth block of single level memory cells being at least the threshold amount.

7. The apparatus of claim 1, direct read requests for a fourth portion of data to a fourth block of single level memory cells in response to an amount of a fourth portion of data being written to the first block of the quad level memory cells.

8. The apparatus of claim 1, direct read requests for the fourth portion of data to the first block of the quad level memory cell in response to completing writing the fourth portion of data the first block of the quad level memory cells.

9. An apparatus, comprising:
an array of memory cells;
a controller coupled to the array of memory cells and the controller is configured to:
   receive commands to write data to the array of memory cells;
   execute the commands by writing the data to single level memory cells and to quad level cells;
   direct read requests for the data to the single level memory cells in response to less than a threshold amount of data being written to the single level memory cells; and
   direct read requests for the data to the quad level memory cells in response at least the threshold amount of data being written to the single level memory cells.

10. The apparatus of claim 9, wherein, in response to the read requests for the data being directed to the quad level memory cells, the data is erased from the single level memory cells.

11. The apparatus of claim 9, wherein the data is written to four pages of single level memory cells and to one page of quad level memory cells.

12. The apparatus of claim 10, wherein, in response to writing a threshold amount of data to a second page of the single level memory cells, direct read requests for a first page of data to the page of quad level memory cells.

13. The apparatus of claim 11, wherein, in response to writing a threshold amount of data to a third page of the single level memory cells, direct read requests for the second page of data to the page of quad level memory cells.

14. The apparatus of claim 12, wherein, in response to writing a threshold amount of data to a fourth page of the single level memory cells, direct read requests for a third page of data to the page of quad level memory cells.

15. A method, comprising:
performing a read operation in a memory array by:
   directing reads for a first portion of data to a first block of single level memory cells in response to an amount of a second portion of data written to a second block of single level memory cells being less than a threshold amount; and
   directing reads for the first portion of data to a first block of a quad level memory cells in response to the amount of the second portion of data written to the second block of single level memory cells being at least the threshold amount.

16. The method of claim 15, further including directing read requests for the second portion of data to a second block of single level memory cells in response to writing the second portion of data the first block of the quad level memory cells.

17. The method of claim 15, further including directing read requests for the second portion of data to the first block of the quad level memory cells in response to completing writing the second portion of data to the first block of the quad level memory cells.

18. The method of claim 17, further including erasing the second portion of data from the second block of single level memory cells in response to directing read requests for the second portion of data to the first block of the quad level memory cells.

19. The method of claim 15, further including directing read requests for a third portion of data to the first block of the quad level memory cells in response to completing writing the third portion of data to the first block of the quad level memory cells.

20. The method of claim 19, further including erasing the third portion of data from a third block of single level memory cells in response to directing read requests for the third portion of data to the first block of the quad level memory cells.

* * * * *